May 30, 1961

V. HECHLER IV 2,986,677

RELAY GATE

Filed June 12, 1957

INVENTOR.
Valentine Hechler IV
BY Watson D. Harbaugh
Atty.

United States Patent Office 2,986,677

Patented May 30, 1961

2,986,677

RELAY GATE

Valentine Hechler IV, Evanston, Ill., assignor to Webcor, Inc., Chicago, Ill., a corporation of Illinois Filed June 12, 1957, Ser. No. 665,257

2 Claims. (Cl. 317—148.5)

This invention relates to a transistor circuit, and more particularly to a relay gate useful in environments wherein it is desired to energize a relay in response to an input signal of predetermined character.

It is relatively simple to provide a gate-type circuit where an input signal is intermittent or varies between zero voltage and a value greater than zero, either in a positive or negative sense. The reason for this, it will be apparent, is that a circuit is readily devised which produces a current flow of sufficient value to energize a relay, for example, when the output signal applied to the circuit has a value greater than zero, and to completely terminate current flow when the signal value is zero. In some environments, however, when the available signal voltage does not at some time have a value of zero, a simple gate circuit is not satisfactory. It is, accordingly, an object of this invention to provide a gate circuit which is effective to cyclically energize and deenergize a relay even though the input signal fed to the circuit never attains a zero voltage value.

Another object of the invention is to provide a circuit operative to energize a relay or equivalent component upon receipt of a low power input signal of predetermined character. Still another object of the invention is in the provision of a transistorized gate circuit that functions to energize a relay or the like when an input pulse of predetermined value is coupled thereto, but which does not energize the relay when signals of other than such predetermined value are received thereby.

Yet another object is that of providing a transistor circuit of the character described, operative to disregard input signals fed thereto having voltage values that are less than a predetermined amount. Still another object of the invention is to provide a transistor and uni-directional current flow device having a breakdown voltage of preselected value in a circuit combination operative to energize a relay connected in the collector circuit of the transistor when input signals of such preselected value are applied across the device. Additional objects and advantages of the invention will become apparent as the specification develops.

An embodiment of the invention is illustrated in the accompanying drawings, in which—

Figure 1:
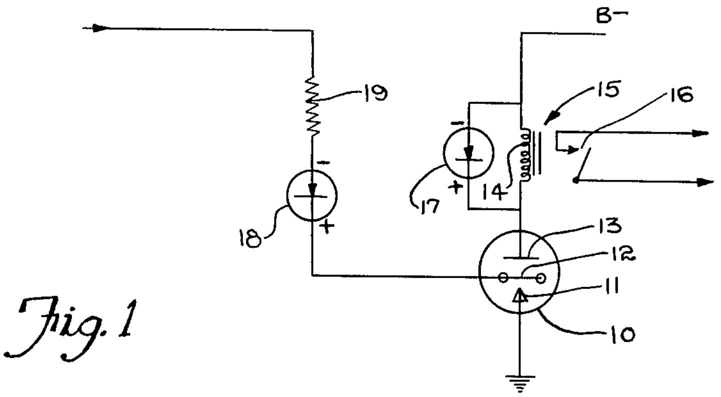
Figure 2:
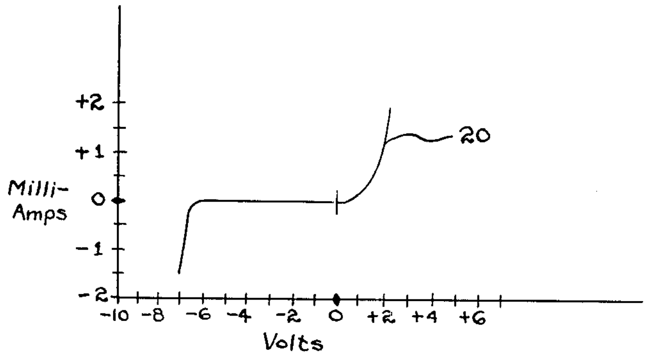

Figure 1 is a schematic diagram of a circuit embodying the invention; and Figure 2 is a graph illustrating the function of the diode employed in the circuit.

The transistor used in the circuit is a junction-type transistor, and is designated with the numeral 10. The transistor has an emitter 11 connected to ground, a base 12 and a collector 13. The energizing coil 14 of a relay 15 having contacts 16 is connected at one end to the collector 13, and at its other end to a negative voltage source, which in the specific illustration may have a value of between —6 and —40 volts.

The contacts 16 of the relay are normally open, and are closed when the flow of current through the energizing coil 14 reaches the necessary value. In shunt across the energizing coil 14 is a uni-directional current flow device in the form of a diode 17 which functions to prevent a build-up of voltage across the transistor. It thereby serves as a protection device for the transistor, and prevents its burning out by minimizing the power dissipation therein. The diode 17 is connected so as to normally prevent current flow through it from the collector 13 to the voltage source, whereby current flow in that direction must be through the energizing coil 14 of the relay.

Connected in series with the base 12 of the transistor is a uni-directional current flow device 18 that may be a Zener diode. Such diodes may be obtained so as to have any desired breakdown voltage in reverse direction, and the one herein employed is designed to breakdown at about —6 to —8 volts. An inspection of the drawing indicates that the diode 18 is normally effective to prevent the flow of current therethrough from the base 12.

In series with the diode 18 on the inlet side thereof is a resistance 19 adapted to be connected to a signal source. The resistance may have a value of about 12K ohms and is a current limiting component that functions to prevent an excessive current drain from the signal source.

The circuit is especially suited for use with binary bits or "flip-flops." Binary bits are simple circuits which function to divide by the numerical value of two the number of input signals applied thereto. Such circuits have two stable conditions. Binary bits are ordinary employed in counter circuits, and one with which the circuit of Fig. 1 has been used has an output that alternates from about —5 to —15 volts but never has a zero voltage output. Thus, some signal voltage is always applied to the resistance 19. Such a circuit is not shown herein, but has been described briefly, for signals applied to the base 12 of the transistor through the diode 18 and resistance 19 may have their origin in such a circuit.

Preferably, the input signal fed to the resistance 19 has a current capability in the order of about one milliamp, and has a voltage value within the range of from —5 to —15.

The operational characteristics of the diode 18 (which is back-biased) are illustrated in Figure 2. The curve 20 extends for a portion along the voltage of $x$ axis, and drops off sharply at a value of about —6 volts, which is the break-down voltage in reverse direction for the particular diode used herein. At a value of approximately zero volts, the curve swings upwardly to indicate a positive current flow.

Ordinarily, the transistor 10 is in a cut-off state with substantially no current flowing in the collector circuit. Thus, the relay 15 is deenergized and the contacts 16 thereof open. It will be apparent that the contacts may be connected in any suitable circuit such as a counter; and also, where desired, the relay 15 could be one in which the contacts are normally closed and are opened upon energization of the coil 14. When an input signal having a voltage value in excess of —8 volts in a negative direction is fed to the resistance 19, the diode 18 breaks down and the transistor 10 begins to conduct. The resultant current flow in the collector circuit energizes the relay 15 to close the contacts thereof. The circuit remains in this conducting state until the input signal again falls below the value of the break-down voltage which is —6 volts. Thereupon, the transistor returns to its cut-off state until receipt of the next input signal, and the conditions are repeated.

While in the foregoing specification an embodiment of the invention has been described in considerable detail for purposes of making an adequate disclosure thereof, it will be apparent that those skilled in the art may make numerous changes therein without departing from the spirit and principles of the invention.

I claim:

1. In a relay gate circuit, a transistor having an emitter, base, and collector, a current energized relay with an energizing coil connected in series with said collector, a diode connected in shunt with said relay and oriented to permit the flow of current around the relay to said collector, a negative voltage source connected across said emitter and collector through said relay, the flow of current from said voltage source being controlled by said transistor, a Zener diode connected to the base of said transistor, said Zener diode poled to have a current blocking function until a voltage in excess of a predetermined value is applied thereacross, a separate signal source for providing an input signal voltage, and a resistive device connected between said signal source and the Zener diode, said resistive device limiting the voltage drawn from the signal source.

2. The circuit of claim 1 in which the voltage source across said emitter and collector is within the range of about −6 to −40 volts with the most positive side of the voltage source being connected to said emitter, while the separate signal source in the base circuit of the transistor provides a varying input signal which never reaches a zero voltage value.

References Cited in the file of this patent

UNITED STATES PATENTS

| | | |
|---|---|---|
| 2,621,808 | Blakeney | Dec. 16, 1952 |
| 2,718,613 | Harris | Sept. 20, 1955 |
| 2,745,021 | Kurshan | May 8, 1956 |
| 2,769,131 | Immel | Oct. 30, 1956 |
| 2,816,262 | Elliott | Dec. 10, 1957 |
| 2,866,106 | Schuh | Dec. 23, 1958 |

OTHER REFERENCES

Publication: "Transistorized Headlight Dimmer," pp. 56, 57 and 122 of "Radio and Television News," August 1955.